(12) United States Patent
Huang et al.

(10) Patent No.: US 9,390,552 B1
(45) Date of Patent: Jul. 12, 2016

(54) METHOD AND DEVICE FOR EXTRACTING SKELETON FROM POINT CLOUD

(71) Applicant: SHENZHEN INSTITUTES OF ADVANCED TECHNOLOGY CHINESE ACADEMY OF SCIENCES, Shenzhen (CN)

(72) Inventors: Hui Huang, Shenzhen (CN); Shihao Wu, Shenzhen (CN); Baoquan Chen, Shenzhen (CN); Liangliang Nan, Shenzhen (CN)

(73) Assignee: SHENZHEN INSTITUTES OF ADVANCED TECHNOLOGY CHINESE ACADEMY OF SCIENCES, Shenzhen (CN)

( * ) Notice: Subject to any disclaimer, the term of this patent is extended or adjusted under 35 U.S.C. 154(b) by 218 days.

(21) Appl. No.: 14/378,976

(22) PCT Filed: Sep. 13, 2013

(86) PCT No.: PCT/CN2013/083441
§ 371 (c)(1),
(2) Date: Aug. 15, 2014

(87) PCT Pub. No.: WO2014/187046
PCT Pub. Date: Nov. 27, 2014

(30) Foreign Application Priority Data

May 23, 2013 (CN) .......................... 2013 1 0196243

(51) Int. Cl.
*G06T 15/00* (2011.01)
*G06T 17/00* (2006.01)

(52) U.S. Cl.
CPC ..................... *G06T 17/00* (2013.01)

(58) Field of Classification Search
None
See application file for complete search history.

(56) References Cited

U.S. PATENT DOCUMENTS

| 8,064,731 | B2* | 11/2011 | Zouhar | G06K 9/00214 345/419 |
| 2014/0125663 | A1* | 5/2014 | Zhang | G06K 9/00214 345/420 |
| 2014/0334670 | A1* | 11/2014 | Guigues | G06T 7/2046 382/103 |

FOREIGN PATENT DOCUMENTS

| CN | 101866495 A | 10/2010 |
| CN | 101887596 A | 11/2010 |
| CN | 103268631 A | 8/2013 |

OTHER PUBLICATIONS

Huang, Hui Etc, L1-Medial Skeleton of Paint Cloud, ACM Transactions on Graphics (TOG)—SIGGRAPH 2013 Conference Proceedings, Jul. 2013,vol. 32, No. 4, p. 65:1-65:8.

*Primary Examiner* — Peter Hoang
(74) *Attorney, Agent, or Firm* — Gokalp Bayramoglu

(57) ABSTRACT

A method for extracting a skeleton form a point cloud includes: obtaining inputted point cloud sampling data; contracting the point cloud using an iterative formula and obtaining skeleton branches, the iterative formula is:

$$\operatorname*{argmin}_{X} \sum_{i \in I} \sum_{j \in J} \|x_i - q_j\| \theta(\|x_j - q_j\|) + R(X), \text{ wherein}$$

$$R(X) = \sum_{i \in I} \gamma_i \sum_{i' \in I/\{i\}} \frac{\theta(\|x_i - x_{i'}\|)}{\sigma_i \|x_i - x_{i'}\|}, \theta(r) = e^{\frac{4r^2}{h^2}},$$

wherein J represents a point set of the point cloud sampling data, q represents the sampling points in the point set J, I represents a neighborhood point set of the sampling points q, x represents the neighborhood points in the neighborhood point set I. R is a regular term, γ is a weighting coefficient, h is a neighborhood radius of the neighborhood point set I, and σ is a distribution coefficient; and connecting the skeleton branches and obtaining a point cloud skeleton.

10 Claims, 3 Drawing Sheets

METHOD AND DEVICE FOR EXTRACTING SKELETON FROM POINT CLOUD

FIELD OF THE INVENTION

The present disclosure relates to a field of computer graphic processing, and more particularly relates to a method and a device for extracting a skeleton from a point cloud.

BACKGROUND OF THE INVENTION

In current productive application, a main bottleneck of three-dimensional technique such as computer-aided design, reverse engineering, virtual reality, and three-dimensional animation and game is that there is no convenient method for quickly obtaining a three-dimensional model stored in a computer until now. How to start from directly scanning point cloud data to directly obtain a practical point cloud model in a short time is still an unsolved problem. Nowadays, three-dimensional laser scanner is widely used because of its advantage of obtaining three-dimensional surface data of a real object conveniently and flexibly. However, a worldwide difficulty of point cloud data processing is that the point cloud data is generally disheveled with a lot of missing points, noise, and exterior points. After researching for more than 20 years, a technique of rebuilding a three-dimensional model from nearly integrated point cloud data is quite mature. Nevertheless, a linchpin restrains it from becoming a global reverse rebuilding technique is that the point cloud data usually has a large-area missing, and this is a problem that present scan devices cannot solve. Besides, it is difficult to quickly rebuild a satisfied three-dimensional model directly from the point cloud data with missing points using present rebuilding method based on fitting.

A point cloud model generally means a point set of three-dimensional coordinate points on a surface of a scanned object calculated by emitting scan light from a three-dimensional scanner to the surface of the scanned object, and receiving reflected light. Point cloud three-dimensional rebuilding means rebuilding mesh data that can represent an original model based on certain point cloud model data, so as to make computer rendering and user interaction convenient.

In order to better processing point cloud date, extracting a skeleton from the point cloud is a very important pre-processing step. Since the skeleton includes topology structure information of the object, the extracting of the point cloud skeleton can be regarded as an understanding process of the shape of the object. Once the point cloud skeleton is obtained, we can use the skeleton to reverse supplement the missing points and increase the point cloud data, laying a foundation for the following point cloud rebuilding process.

On the other hand, extracting of skeleton information is always an important research subject in computer graphics field. Because, no matter in two-dimensional shapes or in three-dimensional shapes, skeleton is an important describing characteristic to the original data. Skeleton information can greatly help us analyzing and operating all kinds of graphics data, such as shape matching based on the skeleton, skeletal animation and so on.

Extracting a skeleton from a closed three-dimensional grid is quite a mature technique, but extracting a skeleton from a disheveled point cloud is a new problem. The technique of extracting a skeleton from a grid cannot be directly apply in extracting a skeleton from a point cloud because there is a lack of grid connecting information in the point cloud, and the present grid skeleton extracting technique cannot solve the problem of noise, exterior points and missing points in the point cloud. A present solution that can extract a curve skeleton from a point cloud is a method proposed in 2009, called rotational symmetry axis (ROSA). The solution proposed a concept of rotation symmetry axes, and supposed that a basic shape of an inputted model mainly consists of cylinders. Supposing a two-dimensional point set and the normal vector of each point are known, we can calculate a rotation symmetry centre point that can mostly represent the center of the point set. Based on this two-dimensional concept, ROSA solution first finds a best tangent plane of each point in the three-dimensional point cloud, and then projects the inputted points near the tangent plane onto the plane, and calculates the rotation symmetry centre points of the point set on the plane. After contracting the rotation symmetry centre points, and specially processing the junction region, rotational symmetry axis is finally obtained. In addition, it is worthy to be mentioned that there is another document proposed a point cloud skeleton extracting technique based on Laplace contraction. This technique supposes the inputted point cloud data is dense and regular enough, so that a Laplace connecting relation can be built based on the point set, corresponding to building a hidden grid. And then extracts the skeleton with a more mature Laplace grid skeleton extracting technique.

However, the ROSA solution in conventional technique deeply depends on point cloud normal vector information and a hypothesis of the basic shape of the object. In ROSA solution, normal vector information is a prerequisite of calculating local rotation symmetry centre points. Supposing the basic shape as a cylinder is a linchpin of well extracting axis even in missing data. But normal vector information is a value estimated from local neighborhood point information rather than obtained directly from a hardware device. On the situation with a great deal of exterior points and noise, it is easy to estimate wrong normal vector and direction, thus, the accuracy of the ROSA solution for extracting point cloud skeleton in conventional technique is low.

SUMMARY OF THE INVENTION

Accordingly, it is necessary to provide a method for extracting a point cloud skeleton that can increase accuracy.

A method for extracting a skeleton form a point cloud includes:

obtaining inputted point cloud sampling data;

contracting the point cloud using an iterative formula and obtaining skeleton branches, the iterative formula is:

$$\underset{X}{\operatorname{argmin}} \sum_{i \in I} \sum_{j \in J} \|x_i - q_i\| \theta(\|x_j - q_j\|) + R(X),$$

$$\text{wherein } R(X) = \sum_{i \in I} \gamma_i \sum_{i' \in N(i)} \frac{\theta(\|x_i - x_{i'}\|)}{\sigma \|x_i - x_{i'}\|}, \theta(r) = e^{-\frac{4r^2}{h^2}},$$

wherein J represents a point set of the point cloud sampling data, q represents the sampling points in the point set J, I represents a neighborhood point set of the sampling points q, x represents the neighborhood points in the neighborhood point set I, R is a regular term, $\gamma$ is a weighting coefficient, h is a neighborhood radius of the neighborhood point set I, and $\sigma$ is a distribution coefficient; and connecting the skeleton branches and obtaining a point cloud skeleton.

In an embodiment, the method further includes:

building a covariance matrix of the sampling points using principal component analysis algorithm;

obtaining the distribution coefficient using the following formula:

$$\sigma_i = \sigma(x_i) = \frac{\lambda 2_i}{\lambda 0_i + \lambda 1_i + \lambda 2_i},$$

wherein λ0, λ1, and λ2 are three characteristic values of the covariance matrix, and λ0≤λ1≤λ2.

In an embodiment, the step of contracting the point cloud using an iterative formula includes gradually expanding the neighborhood radius, and contracting the point cloud according to the expanded neighborhood radius and the iterative formula.

In an embodiment, the step of gradually expanding the neighborhood radius includes defining an initial neighborhood radius $h_0=2d_{bb}/\sqrt[3]{|J|}$, and gradually expanding the neighborhood radius as $h_i=h_{i-1}+h_0/2$, wherein $d_{bb}$ is a diagonal length of a point cloud bounding box, |J| represents an amount of the sampling points in the point set of the point cloud sampling data.

In an embodiment, the method further includes smoothing and centralizing the point cloud skeleton after connecting the skeleton branches and obtaining a point cloud skeleton.

Moreover, it is necessary to provide a device for extracting a point cloud skeleton that can increase accuracy.

A point cloud skeleton extracting device comprises:

a sampling data obtaining module configured to obtain inputted point cloud sampling data:

a skeleton branches generating module configured to generate skeleton branches by contracting the point cloud using an iterative formula, the iterative formula is:

$$\operatorname*{argmin}_{X} \sum_{i\in I}\sum_{j\in J} \|x_i - q_i\|\theta(\|x_j - q_j\|) + R(X),$$

$$\text{wherein } R(X) = \sum_{i\in I} \gamma_i \sum_{i'\in I\setminus(i)} \frac{\theta(\|x_i - x_{i'}\|)}{\sigma_i\|x_i - x_{i'}\|}, \theta(r) = e^{-\frac{4r^2}{h^2}},$$

wherein J represents a point set of the point cloud sampling data, q represents the sampling points in the point set J, I represents a neighborhood point set of the sampling points q, x represents the neighborhood points in the neighborhood point set I, R is a regular term, γ is a weighting coefficient, h is a neighborhood radius of the neighborhood point set I, and σ is a distribution coefficient; and a skeleton generating module configured to connect the skeleton branches and obtain a point cloud skeleton.

In an embodiment, the skeleton branches generating module is further configured to build a covariance matrix of sampling points using principal component analysis algorithm;

the distribution coefficient is obtained using the following formula:

$$\sigma_i = \sigma(x_i) = \frac{\lambda 2_i}{\lambda 0_i + \lambda 1_i + \lambda 2_i},$$

wherein λ0, λ1, and λ2 are three characteristic values of the covariance matrix, and λ0≤λ1≤λ2.

In an embodiment, the skeleton branches generating module is further configured to gradually expand the neighborhood radius, and contract the point cloud according to the expanded neighborhood radius and the iterative formula.

In an embodiment, the skeleton branches generating module is further configured to define an initial neighborhood radius $h_0=2d_{bb}/\sqrt[3]{|J|}$, and gradually expand the neighborhood radius as $h_i=h_{i-1}+h_0/2$, wherein $d_{bb}$ is a diagonal length of a point cloud bounding box, |J| represents an amount of the sampling points in the point set of the point cloud sampling data.

In an embodiment, the device further includes a point cloud skeleton adjusting module configured to smooth and centralize the point cloud skeleton.

The method and device for extracting a point cloud skeleton add a regular term to the conventional point cloud skeleton contracting based on Lagrange intermediate value theorem, so as to make a calculated median point approaches the real median point relying on the regulating effect of the regular term, even if the sampling points are uneven, thereby increasing accuracy.

DETAILED DESCRIPTION OF THE EMBODIMENTS

Figure 1:
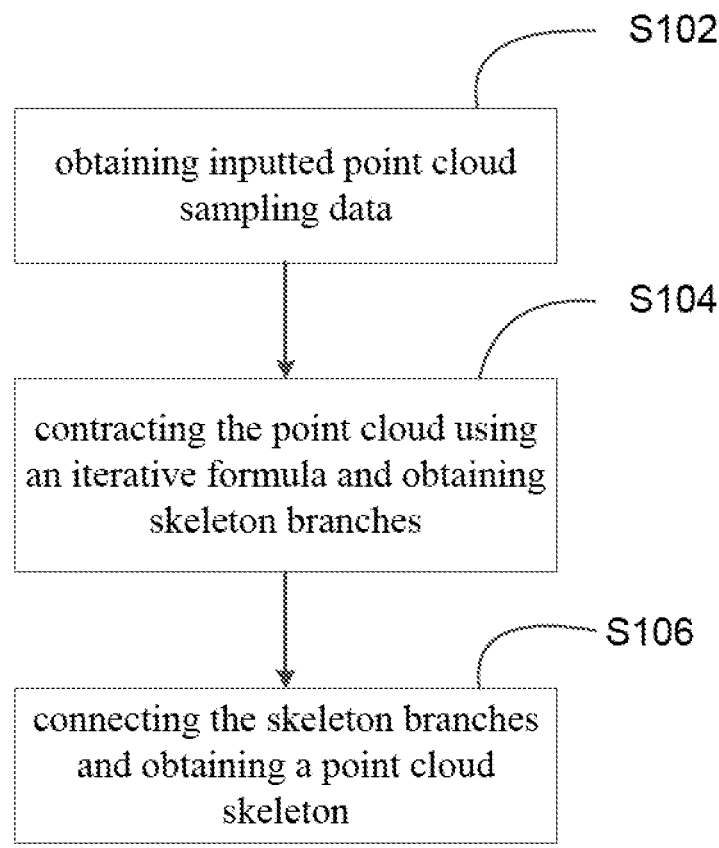
FIG. 1 is a flow chart of a method for extracting a point cloud skeleton with an embodiment.

Referring to FIG. 1, in an embodiment, a method for extracting a point cloud skeleton, which completely rely on computer program that could be run on any computer system based on Von Neumann structure, includes the following steps:

S102, inputted point cloud sampling data is obtained.

The process of obtaining point cloud sampling data (sampling points of a scattered point set) by sampling the scattered point set collected by a point cloud data collecting device, and generating a point cloud skeleton by contracting the sampling points can greatly reduce calculate complex.

In the embodiment, the amount of sampling points is usually 5% of the amount of the inputted scattered points, and the sampling location is random, in other word, 5% of the scattered points are randomly sampled as sampling points. In order to describe it more easily, the following paragraphs uniformly call the inputted scattered points Q, while the sampling point set is X. A neighborhood of the point set has two meanings. One is a neighborhood I of the point set X itself, which means to every point in X $$C_i = \sum_{i'\in I\setminus(i)} \theta(\|x_i - x_{i'}\|)(x_i - x_{i'})^T(x_i - x_{i'}),$$

neighborhood I of $x_i$ is a point set of all neighborhood points with a distance less than h (neighborhood radius) to $x_i$. On the other hand, it means a neighborhood I of the point set X in the point set Q, to every $x_i$ in the point set, it is a point set of all neighborhood points with a distance less than h to $x_i$. The size of the point set X depends on the value of h.

S104, the point cloud is contracted using an iterative formula and skeleton branches are obtained, the iterative formula is:

$$\underset{X}{\mathrm{argmin}} \sum_{i \in I} \sum_{j \in J} \|x_i - q_i\| \theta(\|x_j - q_j\|) + R(X),$$

$$\text{wherein } R(X) = \sum_{i \in I} \gamma_i \sum_{i' \in I\setminus(i)} \frac{\theta(\|x_i - x_{i'}\|)}{\sigma_i \|x_i - x_{i'}\|}, \; \theta(r) = e^{-\frac{4r^2}{h^2}},$$

wherein J represents a point set of the point cloud sampling data, q represents the sampling points in the point set J, I represents a neighborhood point set of the sampling points q, x represents the neighborhood points in the neighborhood point set I, R is a regular term, γ is a weighting coefficient, h is a neighborhood radius of the neighborhood point set I, and σ is a distribution coefficient.

Lagrange intermediate value theorem used in conventional technique is:

$$\underset{X}{\mathrm{argmin}} \sum_{i \in I} \sum_{j \in J} \|x_i - q_i\| \theta(\|x_j - q_j\|), \; \theta(r) = e^{-\frac{4r^2}{h^2}},$$

which calculates a median point x as a point with a smallest value of the distance to all the other points. But in the method for calculating contracted point cloud in conventional technique based on Lagrange intermediate value theorem, the sampling points may be uneven, which makes most of the sampling points superpose to a nearby median point, becoming a sparse distribution, thus obtaining an inaccurate point cloud skeleton after contracting. For example, if the scattering of the sampling points is nearly like a line, the location of skeleton obtained after contracting will be greatly deviated.

While in the embodiment, by adding a regular term R with a distribution coefficient σ, an accurate skeleton location can be obtained from the scattered sampling points owing to the adjusting effect of the regular term.

In the embodiment, we can calculate the distribution coefficient σ using principal component analysis (PCA) algorithm.

A covariance matrix of the sampling points is built using PCA algorithm;

the distribution coefficient is obtained using the following formula:

$$\sigma_i = \sigma(x_i) = \frac{\lambda 2_i}{\lambda 0_i + \lambda 1_i + \lambda 2_i},$$

wherein λ0, λ1, and λ2 are three characteristic values of the covariance matrix, and λ0≤λ1≤λ2.

The purpose of PCA algorithm is to reduce noise and redundancy, elements on the main diagonal line of the covariance matrix are variances on different dimension (energy), and the other elements are covariance between two dimensions (relativity). In order to achieve the purpose of reducing noise, the relativity of different dimensions should be small as possible, that is to make the elements out of the diagonal line in covariance matrix become almost 0. This can be implemented by matrix diagonalization in linear algebra. The value on the diagonal line of the matrix obtained after diagonalizing is the characteristic value of the covariance matrix. This characteristic value is a new variance on different dimensions, and represents the energy of each dimension at the same time.

A covariance matrix of the sampling points is built using PCA algorithm:

$$C_i = \sum_{i' \in I\setminus(i)} \theta(\|x_i - x_{i'}\|)(x_i - x_{i'})^T (x_i - x_{i'}),$$

wherein $x_{i'}$ is a mean value of $x_i$.

From the formula we can see, covariance matrix C, must has three characteristic values, and we can sequence the three characteristic values by size, in the order of λ0, λ1, and λ2.

In the embodiment, the step of contracting the point cloud using the iterative formula further includes gradually enlarge the neighborhood radius, and contracting the point cloud according to the expanded neighborhood radius and the iterative formula.

Furthermore, particularly, the step of enlarging the neighborhood radius includes:

setting a original neighborhood radius $h_0 = 2d_{bb}/\sqrt[3]{|J|}$, gradually enlarging the neighborhood radius as $h_i = h_{i-1} + h_0/2$, in which $d_{bb}$ is a diagonal length of a point cloud bounding box, |J| represents an amount of the sampling points in the point set of the point cloud sampling data.

Since there is no connecting relationship between the points in the point cloud, a neighborhood range is an important global fixed parameter in most point cloud processing algorithm. However, in the present problem, it is infeasible to use fixed neighborhood range. In a complex module, it is necessary to consider a smaller neighborhood range for the sampling points at some positions, or it will be influenced by the points in different shapes of positions; while sometimes it is necessary to consider a larger neighborhood range, so as to contract the sampling points into a correct local shape. Thus, in the embodiment, smaller neighborhood size is first used, i.e. using $h_0 = 2d_{bb}/\sqrt[3]{|J|}$ as an initial neighborhood size to do the contracting. After the sampling points are contracted to a certain size, local sampling points that can obviously build skeleton branches are connected to be a skeleton, and these sampling points are fixed without joining the next contracting. Then, we can gradually increase the neighborhood size according to certain increasing rate, and use the new neighborhood size to contract the sampling points and extract the skeleton. In the embodiment, it is to increase the neighborhood size until all the sampling points are fixed, and a final skeleton is generated.

S106, the skeleton branches are connected and a point cloud skeleton is obtained.

In the embodiment, the step of connecting the skeleton branches and obtaining a point cloud skeleton further includes three sub processes of building, extending, and connecting.

In a certain neighborhood range, after several times of iterative contracting, some local points of the sampling point set X gradually become obvious curve skeleton, and a new skeleton branch can be obtained by simply connecting these points. During the iterative contracting process, the skeleton branch can be extended or combined with other skeleton branches according to the distribution of the sampling points at both ends thereof.

New skeleton branches are built. After certain contracting, we can make a cursory selection to select alternative points that may generate new skeleton branches from the unfixed sampling points, and then make sure if the points can become new skeleton branches using a constraint rule. The method of cursory selection is to calculate the σ value of every sampling point by using PCA algorithm again, and to use k-Nearest Neighborhood algorithm (KNN) of $x_i$ to do the smoothing, particularly, K=5. Finally, select the unfixed sampling points with a σ value greater than 0.9 as alternative points for building skeleton branches. Therefore, searching from alternative points with the greatest σ value along the both ends of the main distance (feature vector with greatest characteristic value) of PCA, searching range is the size of the present neighborhood, and if a alternative point satisfied angle rule (an angle between two neighborhood branches is smaller than 25°) in the searching range, pick the alternative point into the alternative branch. If there is no satisfied point between the two ends of the alternative branch, stop searching. If the number of sampling points in the alternative branch is greater than 5, we consider the branch believable, and mark the corresponding sampling point as a stationary point. Otherwise delete the sampling point from the alternative points. After a round of searching, if there is no alternative point left, stop building new skeleton branches, or go on searching from the alternative point with the greatest a value.

Because the neighborhood size is gradually increased, the skeleton branch formed in different neighborhood is likely to lose connection. Therefore, bridge contacts can be introduced as auxiliary. Whenever a new skeleton branch generated, two ends of the branch will connect to a bridge contact. The points works as a temporary part of the skeleton branch, but actually points to a recent and not fixed sampling point and participates in further contraction. The bridge contact will track the recent sampling point until it is disabled in the following conditions: 1) the tracking distance is beyond a given threshold, 2) the tracking angle (angle between the connection line of the bridge contact and the actual end points of the corresponding branch and the main direction of the branch) is greater than 90; 3) encounters other bridge contacts, and satisfies the conditions of combining or connecting branches.

The skeleton branches are extended based on the bridge contacts. Under a greater contracting of neighborhood size, the sampling points at the ends of the existing skeleton may satisfy the angle rules again. Therefore, with the help of the bridge contacts, corresponding sampling points will return the existing skeleton branch, and keep on searching until the last sampling point doesn't satisfy to the angle rule, and renew the location of the bridge contacts at last.

The skeleton branches are connected based on the bridge contacts. In a certain local area, there may be two or more bridge contacts meeting each other. Only deal with this situation before increasing the neighborhood size. If there is only two bridge contacts in the area, and the angle of the two corresponding branches is greater than 145°, the two branches are merged into one branch, the bridge contacts are disabled; or do nothing. If there is more than two bridge contacts in the area, calculate the average point of these bridge contacts and move the end of the corresponding branch to the average point, the bridge contacts are disabled.

Furthermore, the interference sampling points are removed. During the gradual extending of the neighborhood radius and different stages of contracting, there may be a few sampling points have not formed the skeleton branches and are free around the existing skeleton. Therefore, in order to improve the robustness and efficiency of algorithm, the sampling points close to the branch are deleted.

In the embodiment, the method further includes smoothing and centralizing the point cloud skeleton after connecting the skeleton branches and obtaining a point cloud skeleton.

The steps of smoothing are as below:

First, to each point v1 on each skeleton branch except two ends of the skeleton branches, an angle between v1 and a point v0 before v1 and an angle between v1 and a point v2 after v1 are calculated, if the angles are greater than 50°, the point v1 is Laplace smoothed. i.e. v1=v0/4+v1/2+v2/4.

Second, each branch is four point interpolatory subdivided until a longest section of the branch smaller than a threshold. Suppose v0, v1, v2 and v3 are four continuous points on the branch, the rule of interpolating a new point is as below.

1. A new interpolatory point v is inserted between v1 and v2, in which v=(−v0+9v1+9v2−v3)/16.

2. If v1 is an end point, which means there is no point before v1, then v=(3v1+6v2−v3)/8.

3. If v2 is an end point, which means there is no point after v2, then v=(−v0+6v1+3v2)/8.

Third, the subdivided branches are sampled, which means from the beginning point, the next point is gradually picked up as a sampling node, the node can satisfy a rule that its distance to a previous point is greater than a threshold. Finally a smooth curve skeleton with sections substantially the same length is obtained.

The steps of centralizing are as below:

Each node of each skeleton branch except the two ends can easily get a tangent plane. The plane goes through the node and the vector is perpendicular to the connecting line between the node and the next node. Projecting the points of a neighborhood Q corresponding with the node onto the tangent plane, and then use an elliptical approximation of the two-dimensional point set according to the method of ellipse fitting. If the elliptic fitting error is less than the default threshold, move the node to the corresponding ellipse center. If a plurality of nodes on a branch is is reentered, smooth the branch again. Please note that the neighborhood radius of the tangent plane here is defined by the neighborhood radius corresponding to the node first fixed during the contracting.

Figure 2:
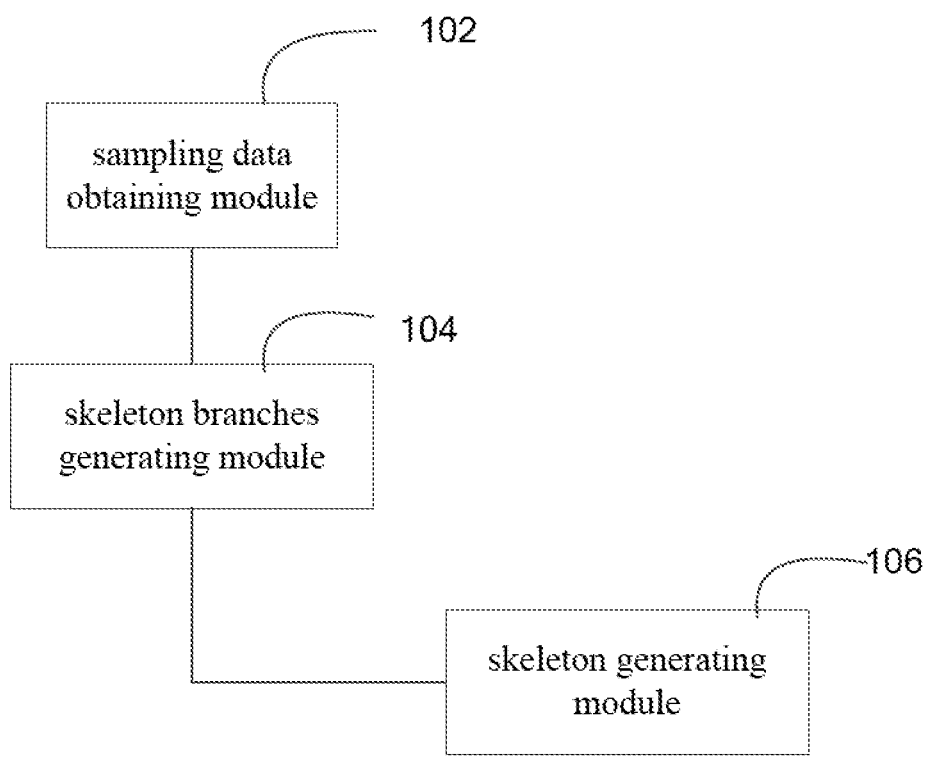
FIG. 2 is a block diagram of a device for extracting a point cloud skeleton with an embodiment.

Referring to FIG. 2, in an embodiment, a device for extracting a point cloud skeleton includes a sampling data obtaining module 102, a skeleton branches generating module 104, and a skeleton generating module 106, wherein:

the sampling data obtaining module 102 is configured to obtain inputted point cloud sampling data;

the skeleton branches generating module 104 is configured to generate skeleton branches by contracting the point cloud according to an iterative formula, the iterative formula is:

$$\underset{X}{\operatorname{argmin}} \sum_{i \in I} \sum_{j \in J} \|x_i - q_i\| \theta(\|x_j - q_j\|) + R(X),$$

$$\text{wherein } R(X) = \sum_{i \in I} \gamma_i \sum_{i' \in N(i)} \frac{\theta(\|x_i - x_{i'}\|)}{\sigma_i \|x_i - x_{i'}\|}, \theta(r) = e^{-\frac{4r^2}{h^2}},$$

wherein J represents a point set of the point cloud sampling data, q represents the sampling points in the point set J, I represents a neighborhood point set of the sampling points q, x represents the neighborhood points in the neighborhood point set I, R is a regular term, γ is a weighting coefficient, h is a neighborhood radius of the neighborhood point set I, and σ is a distribution coefficient: and the skeleton generating module 106 is configured to connect the skeleton branches and obtain a point cloud skeleton.

In an embodiment, the skeleton branches generating module 104 is further configured to build a covariance matrix of the sampling points using principal component analysis algorithm;

the distribution coefficient is obtained using the following formula:

$$\sigma_i = \sigma(x_i) = \frac{\lambda 2_i}{\lambda 0_i + \lambda 1_i + \lambda 2_i},$$

wherein λ0, λ1, and λ2 are three characteristic values of the covariance matrix, and λ0≤λ1≤λ2.

In an embodiment, the skeleton branches generating module 104 is further configured to gradually expand the neighborhood radius, and contract the point cloud according to the expanded neighborhood radius and the iterative formula.

In an embodiment, the skeleton branches generating module 104 is further configured to define an initial neighborhood radius $h_0 = 2d_{bb}/\sqrt[3]{\sqrt{|J|}}$, and gradually expand the neighborhood radius as $h_i = h_{i-1} + h/2$, wherein $d_{bb}$ is a diagonal length of a point cloud bounding box, J represents an amount of the sampling points in the point set of the point cloud sampling data.

Figure 3:
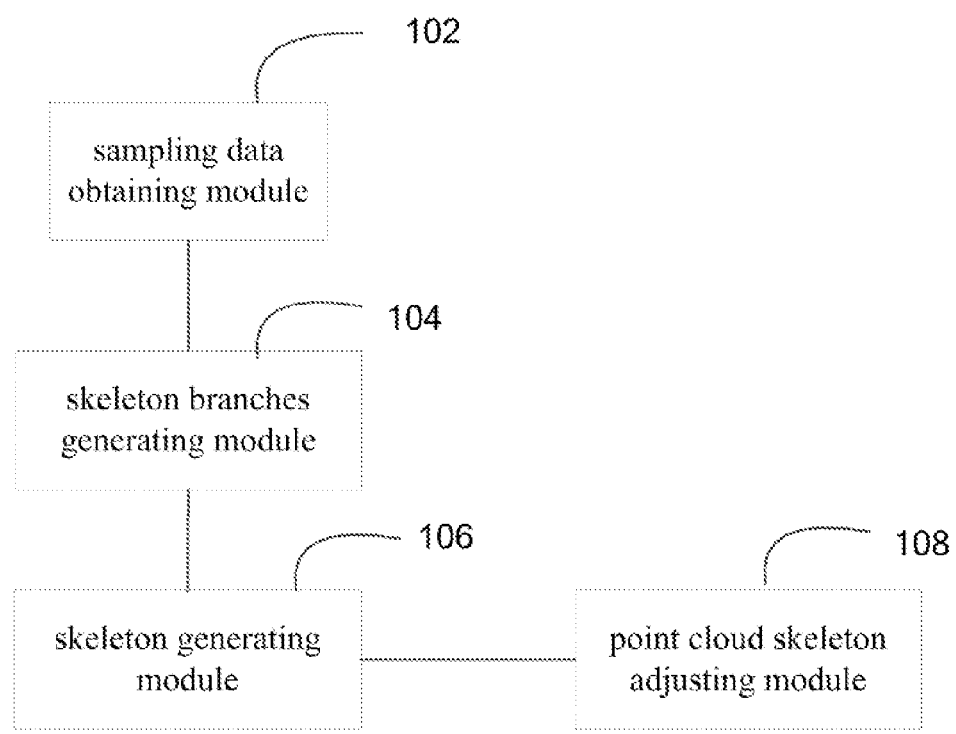
FIG. 3 is a block diagram of a device for extracting a point cloud skeleton with another embodiment.

Referring to FIG. 3, in an embodiment, the device further includes a point cloud skeleton adjusting module 108 configured to smooth and centralize the point cloud skeleton.

The method and device for extracting a point cloud skeleton add a regular term to the conventional point cloud skeleton contracting based on Lagrange intermediate value theorem, so as to make a calculated median point approaches the real median point relying on the regulating effect of the regular term, even if the sampling points are uneven, thereby increasing accuracy.

It can be understood by those skilled in the art that the whole or parts of the process of the method in the above embodiment can be realized by computer program instructing related hardware, the computer program is stored in a computer readable computer memory medium, when the program is executed, it can include such as process of the embodiment of the above each method. The computer memory medium can be diskette, compact disc, Read-Only Memory (ROM) or Random Access Memory (RAM), and so on.

The embodiments described above only show a few implement manners of the present invention, the description is specific and detailed, but it cannot be interpreted as a limitation of the range of the present invention. What should be pointed out is that it is apparent to those skilled in the art that a variety of modifications and changes may be made without departing from the scope of the present invention. Thus, the range of the present invention should be defined by the appended claims.

What is claimed is:

1. A method for extracting a skeleton from a point cloud, comprising:
   obtaining inputted point cloud sampling data;
   contracting the point cloud using an iterative formula and obtaining skeleton branches, wherein the iterative formula is:

$$\underset{X}{\mathrm{argmin}} \sum_{i \in I} \sum_{j \in J} \|x_i - q_i\| \theta(\|x_j - q_j\|) + R(X),$$

wherein $R(X) = \sum_{i \in I} \gamma_i \sum_{i' \in N(i)} \frac{\theta(\|x_i - x_{i'}\|)}{\sigma_i \|x_i - x_{i'}\|}, \theta(r) = e^{-\frac{4r^2}{h^2}},$ wherein J represents a point set of the point cloud sampling data, q represents the sampling points in the point set J, I represents a neighborhood point set of the sampling points q, x represents the neighborhood points in the neighborhood point set I, R is a regular term, γ is a weighting coefficient, h is a neighborhood radius of the neighborhood point set I, and σ is a distribution coefficient; and
connecting the skeleton branches and obtaining a point cloud skeleton.

2. The method according to claim 1, further comprising:
   building a covariance matrix of the sampling points using principal component analysis algorithm;
   obtaining the distribution coefficient using the following formula:

$$\sigma_i = \sigma(x_i) = \frac{\lambda 2_i}{\lambda 0_i + \lambda 1_i + \lambda 2_i},$$

wherein λ0, λ1, and λ2 are three characteristic values of the covariance matrix, and λ0≤λ1≤λ2.

3. The method according to claim 1, wherein the step of contracting the point cloud using an iterative formula comprises:
   gradually expanding the neighborhood radius, and contracting the point cloud according to the expanded neighborhood radius and the iterative formula.

4. The method according to claim 3, wherein the step of gradually expanding the neighborhood radius comprises:
   defining an initial neighborhood radius $h_0 = 2d_{bb}/\sqrt[3]{\sqrt{|J|}}$, and gradually expanding the neighborhood radius as $h_i = h_{i-1} + h_0/2$, wherein $d_{bb}$ is a diagonal length of a point cloud bounding box, |J| represents an amount of the sampling points in the point set of the point cloud sampling data.

5. The method according to claim 1, further comprising smoothing and centralizing the point cloud skeleton after connecting the skeleton branches and obtaining a point cloud skeleton.

6. A point cloud skeleton extracting device, comprising:
   a sampling data obtaining module configured to obtain inputted point cloud sampling data;
   a skeleton branches generating module configured to generate skeleton branches by contracting the point cloud using an iterative formula, the iterative formula is:

$$\underset{X}{\mathrm{argmin}} \sum_{i \in I} \sum_{j \in J} \|x_i - q_i\| \theta(\|x_j - q_j\|) + R(X),$$

wherein $R(X) = \sum_{i \in I} \gamma_i \sum_{i' \in N(i)} \frac{\theta(\|x_i - x_{i'}\|)}{\sigma_i \|x_i - x_{i'}\|}, \theta(r) = e^{-\frac{4r^2}{h^2}},$ wherein J represents a point set of the point cloud sampling data, q represents the sampling points in the point set J, I represents a neighborhood point set of the sampling points q, x represents the neighborhood points in the neighborhood point set I, R is a regular term, γ is a weighting coefficient, h is a neighborhood radius of the neighborhood point set I, and σ is a distribution coefficient; and
a skeleton generating module configured to connect the skeleton branches and obtain a point cloud skeleton.

7. The device according to claim 6, wherein the skeleton branches generating module is further configured to build a covariance matrix of the sampling points using principal component analysis algorithm;

the distribution coefficient is obtained using the following formula:

$$\sigma_i = \sigma(x_i) = \frac{\lambda 2_i}{\lambda 0_i + \lambda 1_i + \lambda 2_i},$$

wherein $\lambda 0$, $\lambda 1$, and $\lambda 2$ are three characteristic values of the covariance matrix, and $\lambda 0 \le \lambda 1 \le \lambda 2$.

8. The device according to claim 6, wherein the skeleton branches generating module is further configured to gradually expand the neighborhood radius, and contract the point cloud according to the expanded neighborhood radius and the iterative formula.

9. The device according to claim 8, wherein the skeleton branches generating module is further configured to define an initial neighborhood radius $h_0 = 2d_{bb}/\sqrt[3]{|J|}$, and gradually expand the neighborhood radius as $h_i = h_{i-1} + h_0/2$, wherein $d_{bb}$ is a diagonal length of a point cloud bounding box, |J| represents an amount of the sampling points in the point set of the point cloud sampling data.

10. The device according to claim 6, further comprising a point cloud skeleton adjusting module configured to smooth and centralize the point cloud skeleton.

* * * * *